United States Patent
Gooch et al.

(10) Patent No.: US 7,792,990 B2
(45) Date of Patent: Sep. 7, 2010

(54) REMOTE CLIENT REMEDIATION

(75) Inventors: Mark Gooch, Roseville, CA (US);
Bruce E. LaVigne, Roseville, CA (US);
Mauricio Sanchez, Roseville, CA (US);
Steven G. Jorgensen, Newcastle, CA (US); Alan R. Albrecht, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 372 days.

(21) Appl. No.: 11/796,973

(22) Filed: Apr. 30, 2007

(65) Prior Publication Data

US 2008/0270606 A1 Oct. 30, 2008

(51) Int. Cl.
*G06F 15/173* (2006.01)

(52) U.S. Cl. ...................... 709/238; 709/245

(58) Field of Classification Search .............. 726/25, 726/22; 370/401, 218, 389, 338, 392, 255; 709/245, 238

See application file for complete search history.

(56) References Cited

U.S. PATENT DOCUMENTS

| | | | |
|---|---|---|---|
| 6,763,018 B1 | 7/2004 | Puthiyandyil et al. | |
| 7,103,045 B2 | 9/2006 | Lavigne et al. | |
| 7,111,072 B1 | 9/2006 | Matthews et al. | |
| 7,159,242 B2 | 1/2007 | Genty et al. | |
| 2005/0114522 A1 | 5/2005 | LaVigne et al. | |
| 2005/0220091 A1 | 10/2005 | LaVigne et al. | |
| 2005/0220092 A1 | 10/2005 | LaVigne et al. | |
| 2006/0075140 A1* | 4/2006 | Sobel et al. | 709/245 |
| 2006/0130139 A1* | 6/2006 | Sobel et al. | 726/22 |
| 2006/0256730 A1* | 11/2006 | Compton | 370/250 |
| 2007/0055752 A1* | 3/2007 | Wiegand et al. | 709/220 |
| 2007/0143392 A1* | 6/2007 | Choe et al. | 709/203 |

\* cited by examiner

*Primary Examiner*—Dustin Nguyen
*Assistant Examiner*—Joel Mesa

(57) ABSTRACT

Embodiments of the invention may include network devices, systems, and methods, including executable instructions and/or logic, for remote client remediation. One method includes identifying a client needing remediation, tunnel-encapsulating packets originating from the client during remediation, and forwarding the tunnel-encapsulated packets to a remote remediation functionality different from an original destination address of the packets and having membership in a remediation VLAN different from the original VLAN.

20 Claims, 9 Drawing Sheets

*300*

| CLIENT MAC ADDRESS | REMEDIATION FLAG | TUNNEL ENCAPSULATION INFO | CLIENT VLAN ID |
|---|---|---|---|
| MAC_C1 | 1 | IP_S3 | V1 |
| *310* | *312* | *314* | *316* |
| • | • | • | • |
| • | • | • | • |
| • | • | • | • |
| MAC_CM | 0 | IP_S3 | VM |

*300*

| CLIENT MAC ADDRESS | REMEDIATION FLAG | TUNNEL ENCAPSULATION INFO | CLIENT VLAN ID |
|---|---|---|---|
| MAC_C1 | 1 | IP_S3 | V1 |
| *310* | *312* | *314* | *316* |
| ⋮ | ⋮ | ⋮ | ⋮ |
| MAC_CM | 0 | IP_S3 | VM |

*Fig. 3*

REMOTE CLIENT REMEDIATION

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN). Network configuration can be dynamic, with clients connecting to and disconnecting from the network, e.g., a laptop user logging into, and out of, the network periodically, or by changing device characteristics, e.g., adding new printer drivers, or printer types, or software upgrades, etc. Managing compatibility between the devices constituting the network is therefore dynamic as well, for example, by ensuring minimum operating system versions and/or patch levels are being used, clients having minimum versions of device drivers, etc.

There is also a need to protect a network from attacks against vulnerable services, data driven attacks on applications, and host-based attacks such as privilege escalation, denial of service attacks, port scans, unauthorized logins and access to sensitive files, viruses, Trojan horses, and worms, among others. Security measures are dynamic in nature, periodically being modified in response to changes in real and perceived threats, risks, and vulnerabilities. Thus, managing network security is dynamic as well, since virus definitions and checking protocols need to be kept up to date, and client access to the network has to be commensurate with changing client rights and network configuration.

Traditionally, computer networks have been relatively open, with access to data only being restricted by standard account access using passwords, etc. More recently, a paradigm shift has developed whereby a client is now required to authenticate itself to the network before being allowed any network access at all. This adds an extra degree of protection to both network devices, e.g., switches, routers, etc., as well as other network clients and servers, etc. To functionally access a network, a client establishes a physical connection, and proceeds through a pass/fail login process to establish their network compatibility and authority. In previous approaches, if a client lacks network authorization or is significantly incompatible, network access is either denied or severely restricted, thus isolating the client from much of the network. Less severe compatibility issues may be addressed manually, e.g., by a network administrator, or trigger notices of deficiencies and availability of compatibility and/or security upgrades, e.g., new software version(s) and/or updated virus definitions available for voluntary downloading and installation at the user's convenience.

Remote client remediation has thus far been implemented by using a remediation Virtual Local Area Network (VLAN) to isolate clients that are in the remediation process. This prevents such clients from otherwise interfering with normal operation of the network or other clients, e.g., through virus spreading, Denial of Service (DoS) attacks, etc. Typically the remediation VLAN has been distributed throughout the networking devices, e.g., switches, routers, etc., to allow any client to easily be placed on the remediation VLAN. However, this requires network changes when a remediation solution, e.g., software patch, is deployed, making it less attractive.

BRIEF DESCRIPTION OF THE DRAWINGS

FIG. 3 illustrates an example lookup table according to an embodiment of the present invention.

DETAILED DESCRIPTION

Embodiments of the present invention may include network devices, systems, and methods, including executable instructions and/or logic, for remote client remediation. In one embodiment of the present invention, a method for remote client remediation includes identifying a client, associated with an original VLAN, needing remediation. Packets originating from the client during remediation are tunnel-encapsulated. The tunnel-encapsulated packets are forwarded to a remote remediation functionality different from an original destination address of the packets and having membership in a remediation VLAN different from the original VLAN.

Figure 1:
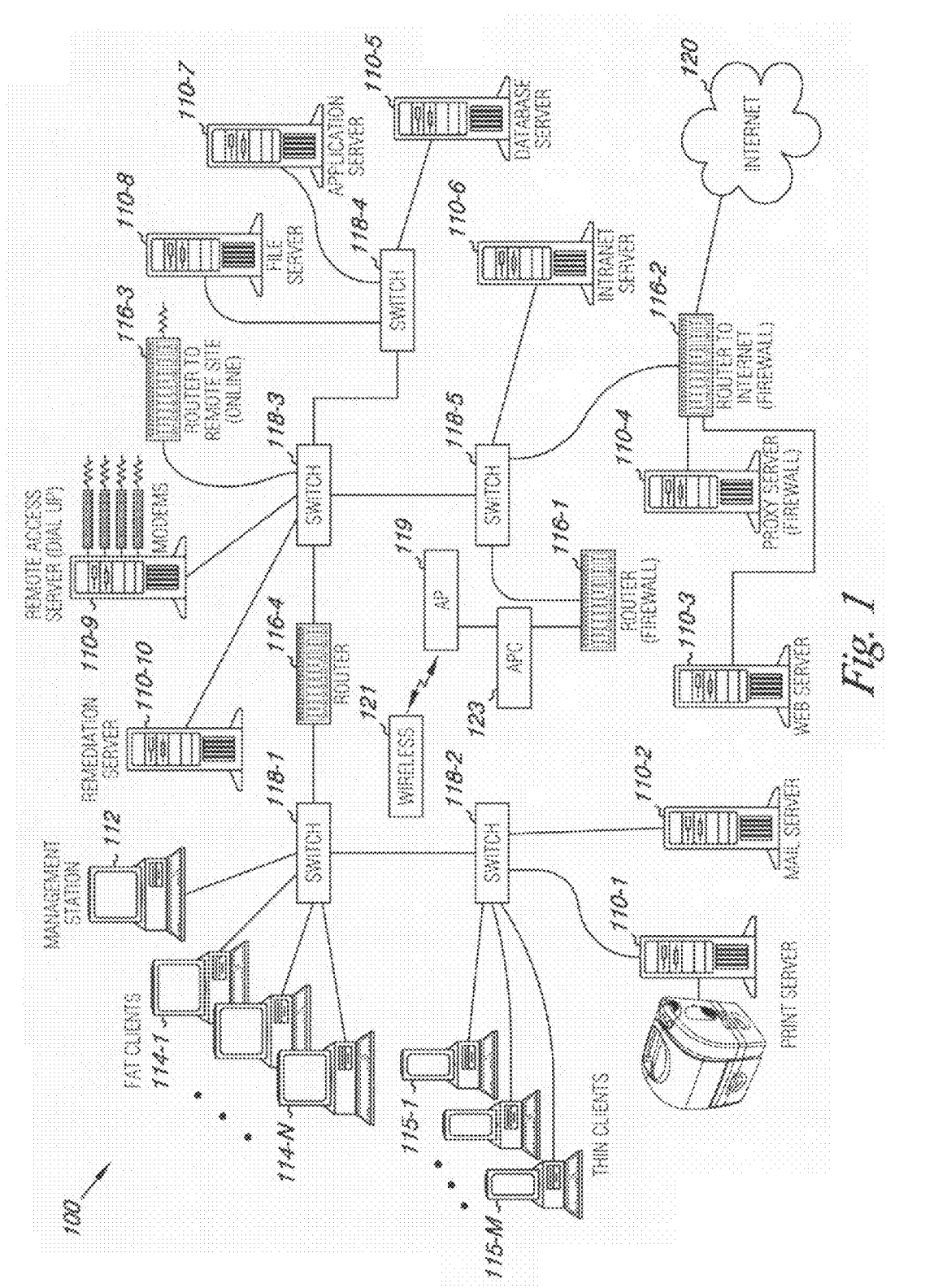
FIG. 1 is an example of a computing device network in which embodiments of the invention can be implemented.

FIG. 1 illustrates an embodiment of a computing device network 100 in which some embodiments of the invention can be implemented. As shown in FIG. 1, a number of devices can be networked together in a LAN, WAN and/or metropolitan area network (MAN) using routers, hubs, switches and the like. As used herein a "network device" means a switch, router, hub, bridge, etc., e.g., a device which may have a processor and memory resources, and is connected to a network 100, as the same will be understood by one of ordinary skill in the art. Although a switch will often be used in this disclosure in describing certain embodiments of the invention, those skilled in the art will realize that embodiments may be implemented with other network devices. As the reader will appreciate, the term network device can also be used to refer to servers, PCs, etc., as illustrated further below.

The example network of FIG. 1 illustrates a print server 110-1 (with printer) to handle print jobs for the network 100, a mail server 110-2, a web server 110-3, a proxy server (firewall) 110-4, a database server 110-5, an intranet server 110-6, an application server 110-7, a file server 110-8, a remote access server 110-9, and a remediation server 110-10. The examples described here do not provide an exhaustive list of servers that may be used in a network.

The network embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks using routers, 116-1, 116-2, 116-3, and 116-4, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or configuration of network devices illustrated in FIG. 1.

Additionally as the reader will appreciate, a number of mobile devices, e.g., wireless device 121, can connect to the network 100 using a wireless air interface, e.g., 802.11, which can provide a signal link between the mobile device 121 and an access point (AP) 119. The AP 119 serves a similar role to a base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g., an Ethernet link, to other network devices, e.g., router 116-1.

As one of ordinary skill in the art will appreciate, each network device in the network 100 can be physically associated with a port of a switch to which it is connected. Information in the form of network packets, e.g., data packets, can be passed through the network 100. Users physically connect to the network through ports or APCs 123 on the network 100. Data frames, or packets, can be transferred between network devices by means of a network device's, e.g., switch's, logic link control (LLC)/media access control (MAC) circuitry, or "engines," as associated with ports on a network device. A network switch forwards network packets received from a transmitting network device to a destination network device based on the header information in received network packets. A network device can also forward packets from a given network to other networks through ports on one or more other network devices. As the reader will appreciate an Ethernet network is described herein. However, embodiments are not limited to use in an Ethernet network, and may be equally well suited to other network types, e.g., asynchronous transfer mode (ATM) networks, etc.

According to embodiments described herein, remediation resources, e.g., the remediation server 110-10 which serves to remediate clients with respect to network compatibility and/or security, can be located in a "centralized" location in network 100. As used herein, the term "centralized" means a particular location in the network 100 accessible from a number of network devices, e.g., 118-1, . . . , 118-5, whether or not the topographical location is in-line with a given packet's intended network path or topographically central to the network 100. To further explain, in network 100 of FIG. 1, certain network devices, e.g., switches 118-1, 118-2, and 118-5, may be referred to topographically as "edge" network devices and other network devices, e.g., switches 118-3 and router 116-4, may be referred to topographically as "central" network devices. As used herein, "edge" network devices topographically means network devices, e.g., 118-1, having ports connected directly to network clients, e.g., 114-1, . . . , 114-N, and 115-1, . . . , 115-M, thus being on the "edge" of the network. The network clients can include servers, "fat" and "thin" clients, including mobile network clients connected through an APC, etc., as discussed above. As used herein, "central" network devices topographically means network devices, e.g., switch 118-3, which are connected to other network devices, e.g., switch 118-5, but which are not necessarily connected directly to network clients such as 114-1, . . . , 114-N, or 115-1, . . . , 115-M, etc.

However, the term "central" in central network devices is not to be confused with the use of the term "centralized." In some embodiments of the present invention, a "centralized" remediation resource, as defined above, may be integral to or associated with an "edge" network device. That is, the topographical location in a given network of the remediation resource can be in association with switch 118-1, connected to "fat" and "thin" clients, 114-1, . . . , 114-N, and 115-1, . . . , 115-M, in FIG. 1, or equally in association with switch 118-3, or switch 118-5, etc. Embodiments are not limited to the examples described herein. As one or ordinary skill in the art will appreciate, the intent is to place a remediation resource in a topographical location in network 100 which has a sufficiently high bandwidth associated therewith, relative to the bandwidth of other devices attached to the network 100, to perform a sufficient throughput associated with a remediation functionality. As the reader will appreciate, certain so termed "edge" network devices, e.g., switch 118-1, may in fact have a large network packet traffic bandwidth capability relative to other network devices, e.g., central network devices 118-3, 118-4, etc., in the network 100 so as to be worthwhile candidates for associating a remediation resource, e.g., remediation server, therewith. Embodiments are not limited to the examples given in connection with FIG. 1.

As used herein, the term "remediation server" is used to mean an embodiment of a remediation functionality for a network, as contrasted with a server performing another specific function or a "network device", e.g., router, switch, and/or hub, etc., which are sometimes considered more as "backbone" component devices to a network. As the reader will appreciate, a remediation server 110-10 includes processor and memory resources capable of storing and executing instructions to perform a particular remediation role or function. A remediation server can also include one or more network chips, e.g., ASICs, having logic and a number of ports, as the same will be known and understood by one of ordinary skill in the art.

In the example network implementation of FIG. 1 a remediation server 110-10 is shown in association with switch 118-3. The remediation server 110-10 functions as a "remediation functionality." In certain embodiments, the remediation functionality performed by the remediation server 110-10 can perform the role of ensuring network compatibility, as may be supplied by a third party vendor of network configuration management devices. In certain embodiments, the remediation functionality performed by the remediation server 110-10 can perform the role of network security management, or another diagnostic device, accounting device, counting device, etc., as may be supplied by a third party vendor. Network compatibility management and network security management functions may be combined into a single remediation resource, implemented in separate devices, or divided up into some mixture of compatibility and security functionality in one, or spread among a number of devices. Redundant remediation resources may be dispersed throughout a network and employed, as necessary, to achieve a desired level of robustness, speed, and/or traffic segregation. Embodiments are not limited to the examples given here. The configurations and operations of such different remediation functionalities are known and understood by one of ordinary skill in the art.

According to an embodiment of the present invention, a network, e.g., network 100, is implemented having a centralized remediation functionality, which may be remote with respect to "edge" network devices to which clients can connect. As the reader will appreciate, network clients are required to meet an established set of criteria in order to functionally interact with the network, i.e., meet established minimum network compatibility, operability, security, and any other network connectivity requirements in place at the time.

Embodiments of the present invention include remote client remediation which has the potential advantage to increase the scope and timeliness of network compatibility and protection. In addition, sharing remediation resource(s) among many network devices has the potential advantage of reducing expense and user-level complexity, by eliminating the need for dedicated remediation resources dispersed throughout the network. However, implementing centralized remediation function(s) requires providing clients access to network remediation resources while isolating certain clients from other portions of the network during the remediation process, and involves sending network traffic to the remediation resource in lieu of locating the remediation resources at every network edge device to which clients may connect, e.g., having a remediation resource available at all edge network devices to which clients are initially associated.

Figure 2:
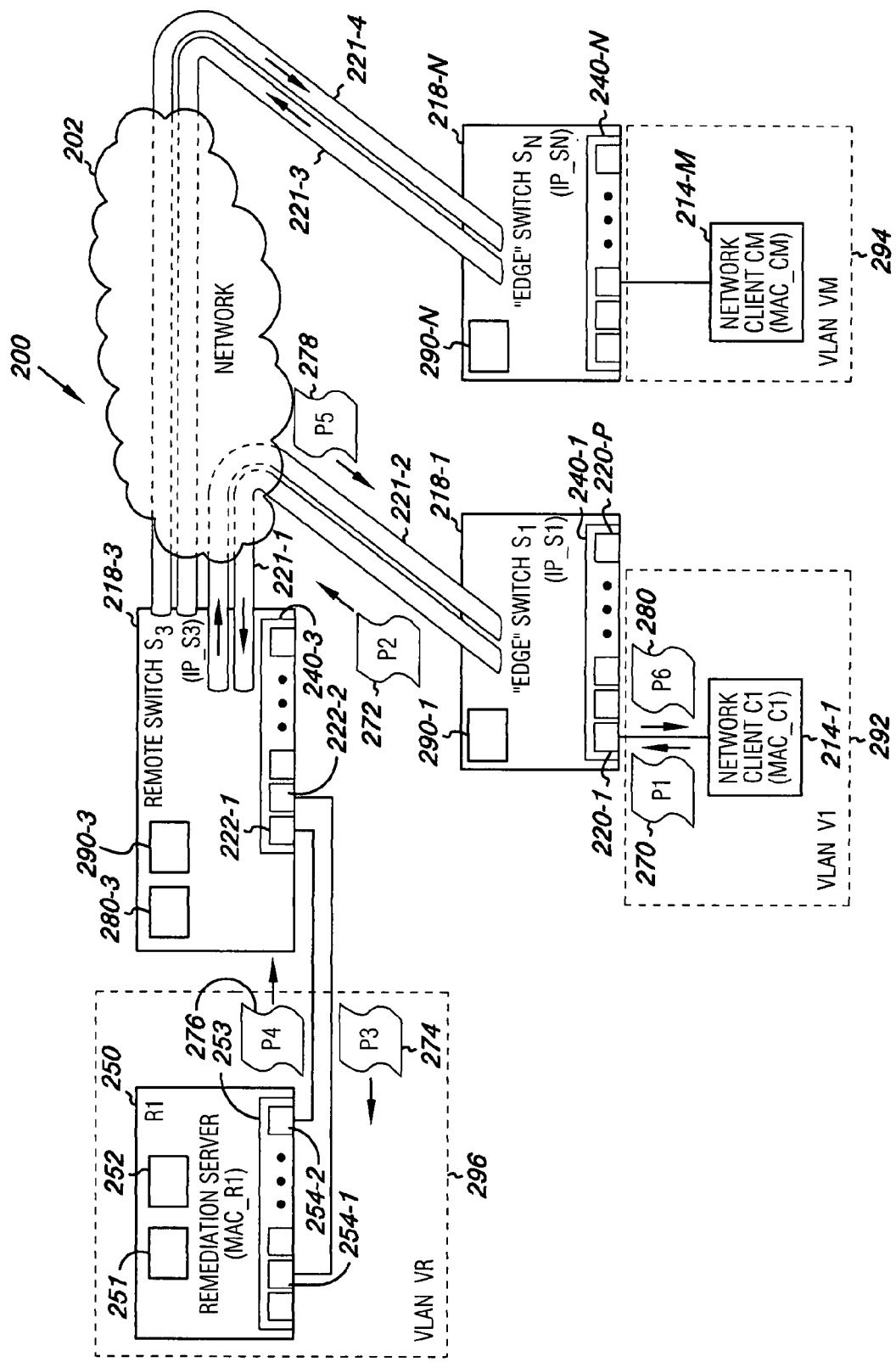
FIG. 2 illustrates a portion of a network, such as shown in FIG. 1, having network devices implementing embodiments of the present invention.

FIG. 2 illustrates network 200, including embodiments of a number of network devices suited to implement embodiments of the present invention. Network 200 includes a remote remediation functionality embodied in the remediation server 250, which is connected to switch S3 218-3. In turn, switch S3 218-3 is connected to a number of other switches in the network, e.g., switch S1 218-1, and switch SN 218-N. The network devices shown in FIG. 2, e.g., 218-1, 218-3, . . . , 218-N, etc., can include switches, routers, hubs, etc. Switch S1 218-1 has a client connected thereto, e.g., 214-1. Likewise, switch $S_2$ also has a client connected thereto, e.g., 214-M. Although such detail is not shown in FIG. 2, such network devices, 218-1, 218-3, . . . , 218-N, etc, can include processor(s) and memory resources. The network devices, 218-1, 218-3, . . . , 218-N, etc., can similarly include a number of network chips, e.g., 240-1, 240-3, . . . , 240-N, etc., including logic circuitry (hardware) which can execute instructions and/or logic. Each network chip, can include a number of network ports, e.g., 220-1, . . . , 220-P, etc. to send and receive data packets (network traffic) throughout the network 200. As mentioned above, the logic circuitry of the number of network chips can be in the form of ASICs and include logic to serve as a media access controller (MAC). The number of ports, which can be included on a network chip, can have access to logic circuitry associated with the network chip and to the processor and memory. A crossbar, crosslink, and/or switching fabric, as the same will be understood by one of ordinary skill in the art, can connect multiple ports and/or multiple chips.

As shown in FIG. 2, a remediation server 250 has been located in a "centralized" location relative to a given network architecture, e.g., associated with switch S3 218-3 in network 200. Network 200 utilizes a centralized remediation functionality to perform, for example, security and compatibility protocols, instead of employing dispersed remediation resources throughout the network. As the reader will appreciate, this example embodiment of the remediation functionality, e.g., remediation server 250, being in a centralized location does not require association of the remediation functionality with a central network device. That is, the centralized location of the remediation functionality, e.g., remediation server 250, may alternatively be associated with an "edge" network device having ports connected directly to network clients, e.g., 214-1, . . . , 214-M. Although FIG. 2 illustrates a single remediation server 250 being connected to one particular switch, e.g., switch S3 218-3, the number and location of remediation functionalities are not so limited, and may exist anywhere in the network as centralized remediation resources.

Since network 200 includes a centralized remediation functionality, e.g., remediation server 250, remote to a number of network devices, e.g., "edge" switches S1 218-1 and SN 218-N having clients connected thereto, data packets are tunneled through a portion of the network 202 to a remote switch, e.g., switch S3 218-3, where they are decapsulated and forwarded as normal to the remediation server 250 for processing. Return packets sent from the remediation server 250 are securely tunneled from the remote switch, e.g., switch S3 218-3, to the "edge" switch, e.g., switch S1 218-1, where they are decapsulated and forwarded as normal to the client, e.g., network client C1 214-1.

The remediation server 250 could also be implemented as an integral part of switch 218-3, or implemented together with other server functions, e.g., remote access server, proxy server (firewall), etc. The remediation server 250 can include processor 251 and memory resources 252 capable of storing and executing instructions to perform a particular remediation role or function. The remediation server 250 can also include one or more chips, e.g., ASICs, having logic and a number of ports, e.g., port 254-1, . . . , 254-2. Network devices, e.g., switch 218-3, which are connected to a remediation functionality, e.g., remediation server 250, or have a remediation functionality implemented therein, may also include one or more lookup tables, e.g., lookup table 280-3, having information on network topology learned from packets arriving from other network devices. In some embodiments of the present invention, computer executable instructions and/or logic can extract information from the fields of packet headers, e.g., MAC header, IP header, etc. In this manner, membership within logical groups, or within logical regions, or in accordance with other network protocols, can "learn" from incoming packets.

A network client, e.g., network client C1 214-1, establishes a physical connection to a network device, e.g., switch S1 218-1. The physical connection may be through a wired or wireless coupling. After establishing a physical connection, the client goes through a login process, e.g., using IEEE 802.1x port based network access control, or some other prescribed method. According to the credentials of the client, during the login process the client is assigned commensurate network parameters and privileges, for example, default virtual local area network (VLAN) membership, e.g., VLAN V1, quality of service level, and network access privileges. These initially-assigned parameters and privileges are implemented and enforced on the edge switch to which the client is attached, e.g., switch S1 218-1. The edge switch, e.g., switch S1 218-1, is tasked with a set of policies that are associated with a particular client, e.g., network client C1 214-1.

As part of the above-mentioned login process, or according to a separate application executing on the client, a determination is made as to whether or not the network client, e.g., network client C1 214-1, is sufficiently compliant with the specified connectivity criteria, or needs to be remediated. Connectivity criteria include, but is not limited to, network compatibility, software version and patch implementation, virus protection levels, etc. If the client is compliant, i.e., up-to-date, the client is allowed its normal network function and access, without need for remediation, according to the parameters and privileges granted at login. If the client is determined to be non-compliant, according to security, network compatibility, or other criteria, then normal access to the network is constrained, subject to the client completing a remediation process. The client is identified as needing to complete a remediation process to reach compliance. The remediation process is intended to bring an authorized client into compliance with the network connectivity requirements, e.g., compatibility, operability and security, and restrict or deny meaningful network access to unauthorized clients. The remediation process typically involves contacting a remediation resource, e.g., remediation server 110-10, to retrieve and apply the relevant updates and patches.

According to one embodiment of the present invention, while the client is being remediated, it is isolated from the rest of the network to protect the network infrastructure, e.g., switches, routers, servers, etc., as well as to protect other network clients, from itinerant behavior by the client, e.g., incompatible operations, spreading viruses, denial of service attacks, etc. The client can be effectively isolated from the rest of the network by forcing client-originated traffic onto a remediation VLAN, e.g., VLAN VR 296, regardless of the VLAN to which the client was originally assigned during the login process. Remediation resources, e.g., remediation server(s) 110-10, are placed on a remediation VLAN, e.g., have membership in remediation VLAN VR 296. Packets received from a client are forced onto the remediation VLAN, despite the client being originally initially assigned to another VLAN during the login process. Where the devices of the remediation VLAN are remote in the network with respect to the client to be remediated, bridged tunneling is used to transparently link the client with remediation resources, e.g., devices of the remediation VLAN. Once the client has completed the remediation process, the client is permitted its normal network access according to the privileges assigned to it at login.

In some embodiments, secure tunnels are used to connect edge switches (to which clients attach) to remote switches (to which a remediation server, or servers, may be attached), thus minimizing network changes. Thus, remote client remediation is achieved by securely tunneling packets originating from, and destined to, the client during remediation, thereby effectively isolating the client to a remote remediation VLAN (associated with one end of the tunnel), and preventing the client from infecting other clients or network devices. A remediation functionality, e.g., a remediation server, is associated with the remote remediation VLAN, and the remediation functionality manages remediation of the client. Forcing client communications to the remediation VLAN administratively confines the client to the remote remediation VLAN. Communications are managed by network devices to make the effective confinement of the client to the remediation VLAN appear transparent to the client and the remediation functionality. In other words, the client and remediation functionality each operate as if both are members of the same VLAN, rather than members of separate VLANS, remotely linked by bridging tunnels, e.g., secure bridging tunnels.

Tunnels, e.g., secure tunnels, are used to transparently transport data packets between clients being remediated, e.g., network client 214-1, and the remediation functionality, e.g., remediation server R1 250, as illustrated in FIG. 2 by tunnels 221-1 and 221-2 between switches S1 and S3, and tunnels 221-3 and 221-4 between switches SN and S3. Using tunnels to transport data between the clients being remediated and the remediation functionality avoids the need to have the remediation VLAN, e.g., VLAN VR 296, available at all edge network devices to which clients might attach. In this manner, network configuration management and changes are minimized while implementing the remediation functionality. Once the client completes the remediation process, it is allowed its normal network access according to the parameters and privileges assigned to it.

According one embodiment of the present invention, the communication "handshaking" process between dispersed remediation resources and dispersed clients being remediated is arranged to be transparent to both the remediation resources and the client. Transparency entails each entity conducting communications as if the other entity resides on the same VLAN. The client 214-1, for example, was assigned to be on VLAN V1 292 at login (similarly, client 214-M is shown as being assigned to VLAN VM), while the remediation functionality, e.g., remediation server R1 250, is associated with VLAN VR 296. However, as described below in more detail, through use of bridged tunnels linking the client 214-1 to the remediation server 250, lookup tables, and data packet modification, the two network entities in communication appear to the other as if they are on the same VLAN, and communications can be conducted accordingly.

The following description is for a packet exchange as a part of a remediation process between the network client, e.g., network client C1 214-1, and a remediation functionality, e.g., remediation server R1 250. According to embodiments of the present invention, the network device, e.g., switch S1 218-1, has a client remediation lookup table 290-1.

FIG. 3 illustrates an example lookup table, e.g., lookup table 290-1 on switch S1 218-1 in FIG. 2, according to an embodiment of the present invention. Entries stored in the client remediation lookup table 300 are keyed to a MAC address of the client 310. For example, MAC_C1 could represent the MAC address for a network client, e.g., client C1 shown at 214-1 in FIG. 2. Information included for each entry includes, but is not limited to, remediation status of a client, i.e., a remediation flag 312, client (original) VLAN association 316, and tunnel encapsulation information 314, all indexed to and corresponding with the MAC address 310 of the client.

The client remediation lookup table 300 is programmed with information associated with the network client upon client connection, login, or upon determination that the network client needs remediation. The MAC address of the network client, e.g., MAC_C1 310 for network client C1 is used as the lookup key. The remediation flag 312 is set, for example, to "1" indicating remediation is required, or "0" indicating remediation is not required. Tunnel encapsulation information is included in the table entry including the IP destination address, e.g., IP_S3 314, of the remote device, e.g., switch S3 218-3 shown in FIG. 2, to which the remediation server, e.g., 250 in FIG. 2, is connected, as well as identity information for the originally-assigned client VLAN ID 316, e.g., VLAN V1 292 in FIG. 2, of the network client.

In one operational flow embodiment, the client remediation lookup table 290-1 is used in the communication process between the network client, e.g., network client C1 214-1, and the remediation functionality, e.g., remediation server 250. Attempting to communicate with a remediation resource, e.g., remediation server 250, the network client C1 sends a data packet having a P1 configuration 270 to the remediation functionality, e.g., remediation server 250. Data packet 270 is initially received at the network device 218-1 through a port 220-1.

Figure 4A:
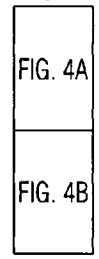
FIGS. 4A and 4B illustrate example packet configurations according to an embodiment of the present invention.
Figure 4A:
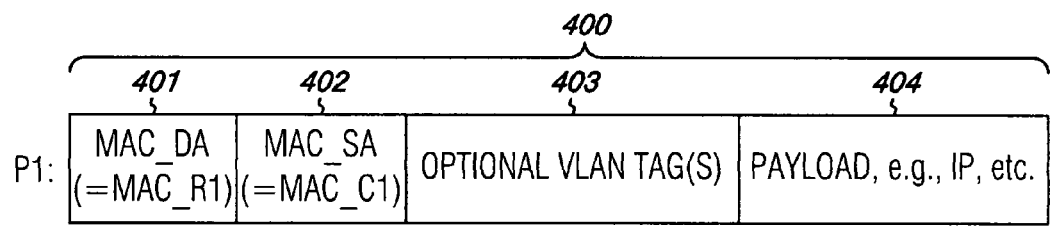
Figure 4A:
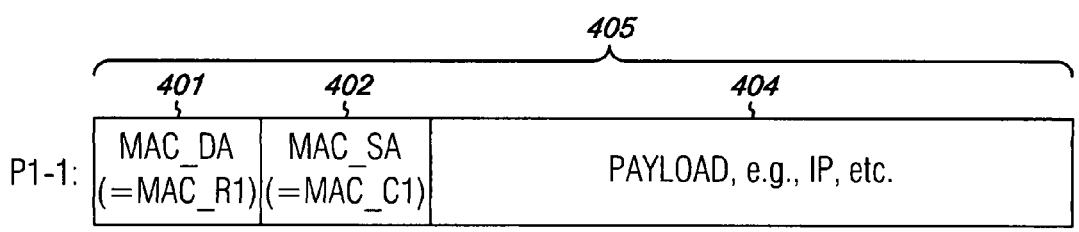
Figure 4A:
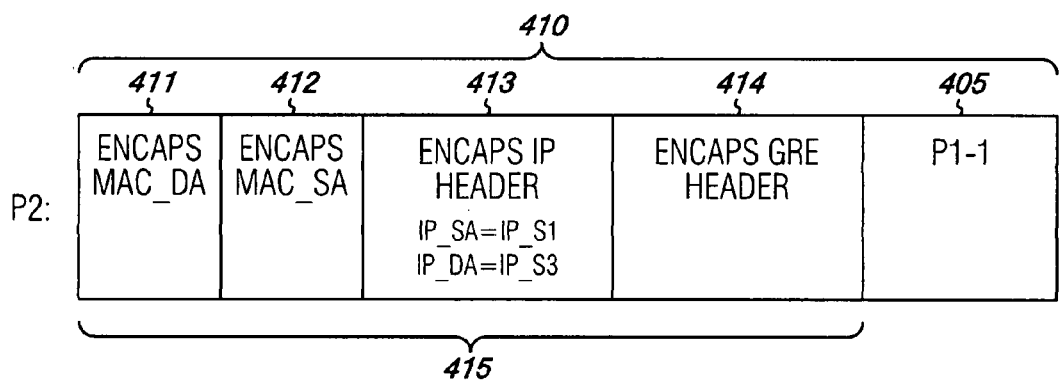

FIG. 4A illustrates a packet 400 having a P1 configuration. The P1 configuration includes an original MAC destination address, e.g., MAC_R1 401, an original MAC source address, e.g., MAC_C1 402, optional VLAN tag(s), e.g., 403, and a payload, e.g., 404. Upon receiving the packet, logic on the network device, e.g., network switch 218-1, performs a lookup into table 290-1 using the MAC source address of packet 270 (shown as MAC_SA 402 in packet 400 of FIG. 4A), i.e., MAC_C1, as the search key. If a match for the MAC address of the network client is found in the lookup table 290-1, and the remediation flag, e.g., remediation flag 312, is set indicating the network client needs to be, or is being, remediated, the network device, e.g., switch S1 218-1, preferably strips away any optional VLAN tags 403 from the packet having configuration P1, thus forming a packet having configuration P1-1 as shown in FIG. 4A.

The optional VLAN tag(s) 403 are preferably removed from the packet because the information represented thereby cannot be trusted since network client C1 is not yet deemed compliant during remediation. For example, network client could be maliciously sending packets, e.g., packet 270, containing a virus, with deceptive optional VLAN tags 403 in an attempt to fool the forwarding process of switch S1 218-1. In addition, the optional VLAN tag(s) 403 in data packets, e.g., packet 270, are generally irrelevant to the remediation process; therefore, it is not necessary to occupy network communication bandwidth by carrying any such VLAN tags 403 through the tunnel 221-1 to the remediation server R1 250. Alternatively, optional VLAN tag(s) 403 can be left in the packet, and ignored in subsequent processing.

FIG. 4A illustrates a packet 405 having a P1-1 configuration. The P1-1 configuration is identical to the P1 packet configuration, e.g., packet 400, without the optional VLAN tag(s) portion, e.g., 403. Therefore, a packet having a P1-1 configuration still includes the original MAC destination address, e.g., MAC_R1 401, the original MAC source address, e.g., MAC_C1 402, and the payload, e.g., 404.

The stripped packet having configuration P1-1 is thereafter tunnel encapsulated with the addition of an encapsulation header 415 to form a packet 272 having configuration P2. FIG. 4A illustrates an embodiment of a packet 410 having a P2 packet configuration, which includes the P1-1 stripped data packet 405 and an encapsulation header 415. The encapsulation header 415 includes the encapsulated packet's destination address, e.g., ENCAPS MAC_DA 411; the encapsulated packet's source address, e.g., ENCAPS MAC_SA 412; encapsulation internet protocol (IP) header information 413, and a GRE header 414. Other encapsulation header 415 examples include Ethernet-within-IP (RFC3378), Layer 2 Tunneling Protocol (L2TP-RFC3931), etc.

FIG. 2 illustrates the tunnel-encapsulated packet, e.g., packet 272, having a P2 configuration being communicated through tunnel 221-1, from switch S1 218-1 to switch S3 218-3. For this example, in the encapsulation IP header 413 of the packet 272 having the P2 configuration, the IP source address is set to that of the source switch S1, e.g., IP_SA=IP_S1, and the IP destination address is set to that of the destination switch S3, e.g., IP_DA=IP_S3, as shown in FIG. 4A. The IP destination address, e.g., tunnel encapsulation information 314, was determined for packet 272 from lookup table 290-1, using the MAC source address of the client, e.g., MAC_C1 402, since packet 272 originates from network client 214-1 during remediation.

Figure 4B:
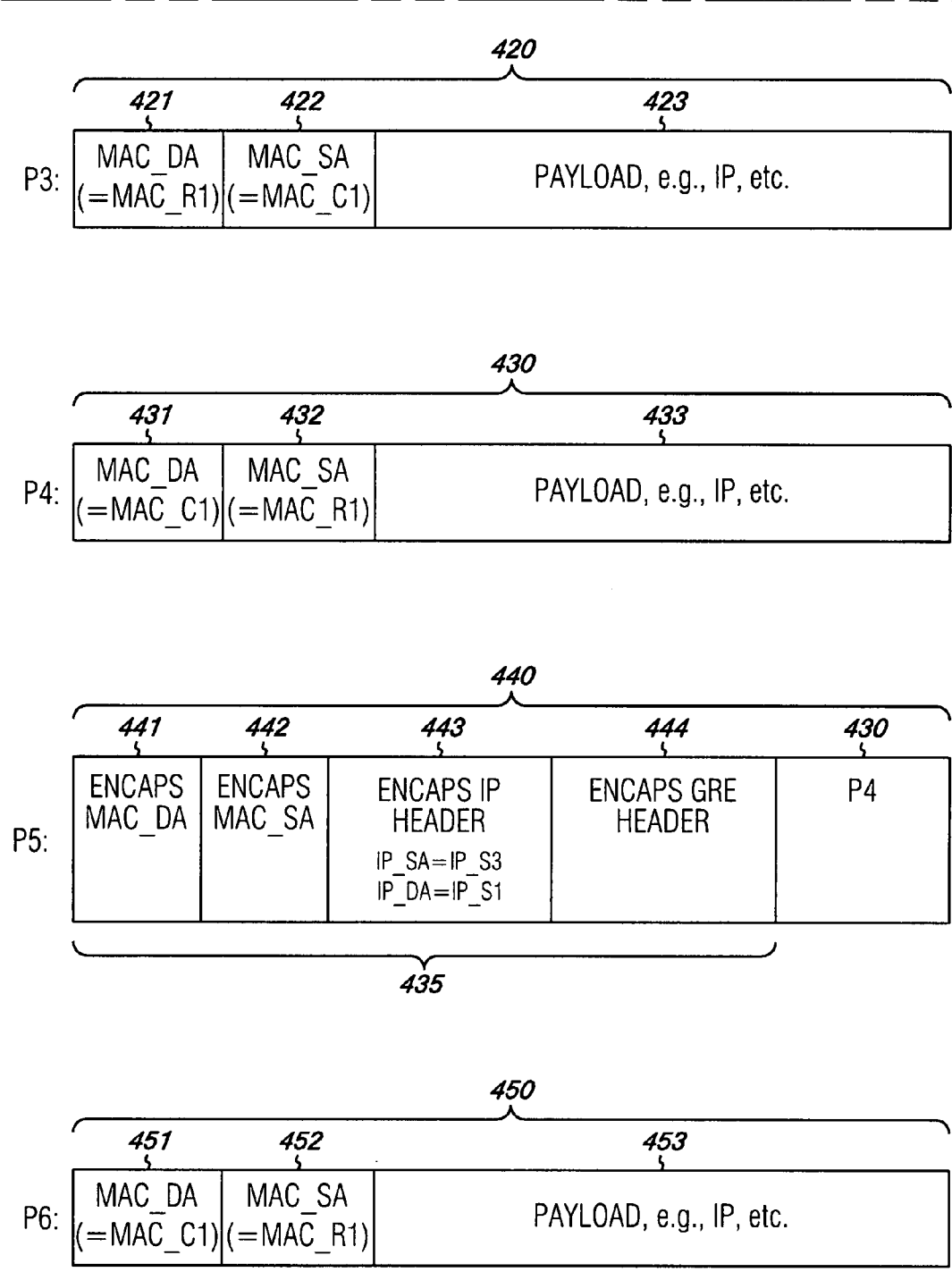

Packet 272 having configuration P2 is communicated across a portion of the network 202, arriving at switch S3 218-3. Switch S3 218-3 recognizes from the encapsulation header, e.g., 415, that this packet, e.g., network packet 272, is being tunneled for remediation. The encapsulation header 415 is removed, thus generating packet 274 having configuration P3 as shown in FIG. 4B. Packet configuration P3 is identical to packet configuration P1-1, the packet still including the original MAC destination address, e.g., MAC_R1 421 (identical to 401), the original MAC source address, e.g., MAC_C1 422 (identical to 402), and the payload, e.g., 423 (identical to 404). Since switch S3 218-3 has already determined that packet 274 having configuration P3 is intended for remediation, it is placed on VLAN VR 296. Switch S3 218-3 is programmed ahead of time that the remediation VLAN is VLAN VR 296. Switch S3 218-3 forwards decapsulated packet 274 having a P3 configuration according to normal forwarding logic to its destination, e.g., to remediation server R1 250 as indicated by the packet's MAC destination address 421 of MAC_R1.

The normal forwarding logic implemented by switch S3 218-3 for packet 274 includes performing a MAC source lookup using the source VLAN and the source client, e.g., {VR, MAC_C1} used to allow switch S3 218-3 to "learn" the location of clients in the network. For the first packet received by switch S3 218-3 from client C1 214-1, the "learn" process generates an exception due to failure of the forwarding lookup, and switch S3 218-3 "learns," i.e., records in a lookup table, that packets, e.g., packet 272, originating from client C1 214-1, came from a tunnel 221-1 originating from switch S1 218-1. As one skilled in the art will appreciate, this information is determined by examining the encapsulation header 415 of packet 272 having configuration P2, specifically, the IP_SA field of the encaps IP header 413. This "learn" process, occurring on receipt of the first packet sent from client C1 214-1, is used later by switch S3 218-3 to determine the return tunnel, e.g., 221-2 for sending packets addressed to network client 214-1.

The results of a "learn" process occurring during remediation are somewhat different from the results of a "learn" process occurring outside of a client remediation process. During remediation, switch S3 "learns" the network configuration that includes network client C1 214-1 being located at the other end of a tunnel, e.g., tunnel 221-2, to IP_S1, i.e., to switch S1 218-1, established for remediation. Absent a remediation process, i.e., when data packets do not arrive at a switch from a remediation tunnel, the switch would "learn" that a client is located on a physical port, e.g., switch S1 218-1 would "learn" that network client C1 214-1 is attached to port 220-1. The above-described "learn" process is a standard part of the operation of network switches, e.g., 218-1, 218-3, . . . , 218-N, and occurs as a packet is being sent to its destination using regular hardware forwarding logic. For example, the "learn" process occurs in parallel with forwarding the packet by copying the packet to the switch's CPU to program an entry in hardware forwarding tables.

After the packet, e.g., packet 274, reaches the remediation functionality, e.g., remediation server R1 250, the remediation functionality acts on the packet as appropriate, depending on the packet payload. The specific remediation process is a design choice for the network administrator according to the network owner/operator policies to be enforced, as will be appreciated by those having ordinary skill in the art.

To continue the remediation process, it may be necessary for the remediation functionality, e.g., remediation server 250, to periodically communicate data packets to the client, e.g., network client 214-1, as illustrated in FIG. 2 by packet 276 having packet configuration P4. Packet 276 may be completely new, i.e., having no relationship whatsoever with packet 274.

FIG. 4B illustrates a packet having a P4 configuration. A packet having a P4 configuration includes similar fields to a packet having a P3 configuration; however, because the communication path is reversed (packet 276 is sent to client C1 from the remediation server R1) compared to packet 274 having a P3 configuration, the data contained in the respective fields is different. Packet 276 having a P4 configuration includes a MAC destination address of the network client C1 214-1, e.g., MAC_DA=MAC_C1 431, a MAC source address of the remediation server R1 250, e.g., MAC_SA=MAC_R1 432, and a payload, e.g., 433 (which need not have any relation to payload 423).

Packet 276 having a P4 configuration is received from the remediation functionality 250 at switch S3 218-3. Packet 276 is assigned to the remediation VLAN, e.g., VLAN VR 296, because it arrived on port 222-1, and switch S3 is programmed with information that the remediation server R1 250, operating on VLAN VR 296, is attached to port 222-1. Switch S3 218-3 performs forwarding lookups on this packet based on the remediation VLAN VR 296 and the remediation server 250, e.g., {VR, MAC_R1}, as the MAC source lookup to determine any prior "learns," and based on the remediation VLAN VR 296 and the network client 214-1, e.g., {VR, MAC_C1}, as the MAC destination lookup to determine where to forward the received packet 276. The lookup based on the remediation VLAN VR 296 and the network client 214-1, e.g., {VR, MAC_C1}, returns forwarding information "learned" when packet 272 first arrived from client 214-1 to switch S3 218-3. This information consists of a tunnel flag, along with the IP address of the tunnel destination, e.g., IP_S1, indicating packet 276 is to be tunneled to switch S1 218-1. As a result, switch S3 218-3 adds an encapsulation header to packet 276, thus forming packet 278 having a P5 configuration.

FIG. 4B illustrates an embodiment of a packet having a P5 packet configuration 440, which includes the P4 data packet 430 and an encapsulation header 435. The encapsulation header 435 includes the encapsulated packet's destination address, e.g., ENCAPS MAC_DA 441; the encapsulated packet's source address, e.g., ENCAPS MAC_SA 442; encapsulation internet protocol (IP) header information 443, and a GRE header 444. In the encapsulation IP header of a packet having a P5 configuration, the IP source address is now set to that of switch S3 218-3, e.g., IP_SA=IP_S3, and the IP destination address is now set to that of switch S1 218-1, e.g., IP_DA=IP_S1, to reflect the reversed packet direction, i.e., now from switch S3 218-3 to switch S1 218-1.

Packet 278 having a P5 configuration is communicated across a portion of the network 202, arriving at its destination, e.g., switch S1 218-1. Switch S1 determines that the packet is received from a tunnel associated with a remediation process by examination of the encapsulation header fields, e.g., ENCAPS IP header 443 and ENCAPS GRE header 444. Packet P5 is decapsulated, resulting in packet 280 having a P6 configuration.

FIG. 4B illustrates a packet having a P6 configuration. A packet having a P6 configuration includes similar fields, e.g., identical, to a packet having a P4 configuration including a MAC destination address of the network client C1 214-1, e.g., MAC_DA=MAC_C1 451, a MAC source address of the remediation server R1 250, e.g., MAC_SA=MAC_R1 452, and a payload, e.g., 453.

Switch S1 218-1 performs a search of the client remediation table 290-1 using the destination MAC address of packet 280 (having a P6 configuration), e.g., MAC_C1, as a key. The matching entry indicates the network client 214-1 has its remediation flag 312 set, and that the VLAN of the client is the original VLAN V1 316, as determined from the remediation lookup table 390-1, and which is assigned to the packet 280, i.e., the packet is associated with the original client VLAN. Although not shown in FIG. 4B, the P6 packet configuration may include a VLAN tag, as determined based on the function of the output port, e.g., port 220-1, and destination VLAN, e.g., VLAN V1 292. In this manner, it appears to the network client 214-1 that the remediation server 250 which originated the packet, is on VLAN V1 292, even though the remediation server 250 is actually associated with a remote remediation VLAN, e.g., VLAN VR 296. The fact that remediation communications are crossing VLAN boundaries is transparent to both the remediation resources, e.g., remediation server 250, and to remediation clients, e.g., network client C1 214-1. At no time is network client 214-1 cognizant that the remediation resources, e.g., remediation server R1 250, are remotely located, or the existence of the separate remediation VLAN VR 296.

Switch S1 218-1 also performs forwarding lookups on the decapsulated packet 280 based on the packet being associated with the original VLAN V1 292 and the packet being sent from the remediation server 250, e.g., using {V1, MAC_R1} as the MAC source lookup, to determine any "learns," and lookups based on the packet being associated with the original VLAN V1 292 and the packet being addressed to network client 214-1, e.g., using {V1, MAC_C1} as the MAC destination lookup, to determine where to forward the packet 280. The MAC destination lookup indicates that packet 280 is to be sent out of port 220-1 to reach network client 214-1 connected thereto. The portion of the packet forwarding process involving ordinary MAC source and MAC destination lookups, i.e., after packet configuration manipulations described herein, are conventionally accomplished as will be understood by those having ordinary skill in the art.

Although only one remediation resource, e.g., remediation server R1 250, is shown in FIGS. 1 and 2, a network, e.g., network 100, can include more than one remediation resource, i.e., remediation functionality, remediation server, etc., and in fact, depending on the configuration and application of the network, dispersed remediation resources may be desirable for robustness and/or to achieve the necessary throughput. Additional remediation resources can be scattered appropriately throughout the network, e.g., by being attached to multiple different network switches. Thereby, remediation services can be divided-up between available remediation resources, or diverted as necessary to available remediation resources. Remediation traffic routing can be directed by appropriately managing remediation lookup tables, e.g., 290-1, and more specifically, the tunnel encapsulation portion of remediation table entries, e.g., 314, to "point" remediation traffic from a particular client to the desired remediation resource.

The process described above is for a well-behaved client following the established protocol for accomplishing remediation. Alternative measures are needed to process clients which are not well-behaved, or not cooperative, or malicious, e.g., the client is infected with a virus. If a client, e.g., network client C1 214-1, attempts to send a packet, e.g., packet 270 having a P1 configuration, to a random destination MAC address, i.e., MAC_DA 401, that is not the MAC destination address of the remediation functionality, i.e., MAC_DA 401 is not set to MAC_R1, similar initial packet forwarding measures are followed to identify the client as needing remediation and isolate the packets originated by the client from the network by tunneling its packets to the remediation VLAN, e.g., to switch S3 218-3. For example, an entry is created for the client into the remediation lookup table 290-1, the packet is still stripped of optional VLAN tags, encapsulated, and tunneled to switch S3, where it is decapsulated and any "learns" are processed as previous described for a well-behaved client. The processing for a packet to reach the switch associated with the remediation VLAN is based upon the MAC source address of the client, e.g., MAC_SA 402. And traffic from a client needing remediation is prepared and tunneled to the remediation VLAN as described above.

However, since the packet is not specifically addressed to a remediation functionality, e.g., remediation server 250, on the remediation VLAN, e.g., VLAN VR 296, switch S3 218-3 will not know where to send the packet. According to one embodiment of the present invention, switch S3 218-3 floods the packet, e.g., now packet 274 having a P3 configuration, to all ports on switch S3 that are a member of the remediation VLAN VR 296. By this method, the remediation server R1 250 will still receive the packet 274. However, because the packet 274 received by the remediation server R1 250 is not addressed to R1, i.e., the MAC destination address is not MAC_R1, the received packet 274 is ignored and the remediation functionality, e.g., remediation server R1 250 takes no further action in response to packet 274. Remediation servers are "hardened" devices, as is understood by those having ordinary skill in the art, since by receiving all manner of packets, are subjected to all kinds of possible attacks.

According to another embodiment of the present invention, the packet flooding action of switch S3 218-3 in response to receiving a packet having an address unknown to switch S3 218-3 is not desired, for example, to prevent overwhelming the remediation functionality, e.g., remediation server R1 250, switch S3, or the devices associated with the remediation VLAN attached thereto with junk packets. Accordingly, switch S3 218-3 is programmed and/or configured to simply drop all packets emerging from remediation tunnels that would otherwise be flooded, i.e., packets not specifically addressed to a known remediation functionality.

According to another embodiment of the present invention, once the client has information identifying a remediation functionality, e.g., an IP address and MAC address of the remediation server 250, switch S1 218-1 can be programmed and/or configured to drop all packets that would otherwise be flooded at the remote switch, i.e., packets not specifically addressed to a remediation functionality. Other methods for efficiently ignoring or dropping maliciously-generated packets are also contemplated by the present invention, as will be understood by those having skill in the art.

Recall the well-behaved client appropriately addresses packets to a remediation functionality in an effort to become remediated. Therefore, the client needs to be informed of the MAC address of the remediation server R1. According to one embodiment of the present invention, remediation information is communicated to the client as a part of the login process, for example, the client login process can include passing information from the client about the state of the client, e.g., software versions, virus definition versions, etc., and receiving information to the client to point the client to a remediation server. In one example implementation of the present invention, information to point the client to a remediation server is the name of a remediation server, e.g., rs1.remediation.hp.com, which the client resolves via DNS (Domain Name System) to an IP address, which may in-turn be resolved to a MAC address, e.g., MAC_R1, using the well known Address Resolution Protocol (ARP), or any other appropriate method. According to another example implementation of the present invention, software executes on the client as part of the remediation process, to effectively do the same as described above, and including the step of contacting a well-known remediation master system domain, e.g., master.remediation.hp.com, to obtain the name of a remediation server to use.

According to another embodiment of the present invention, if the client is not executing client remediation software, i.e., the client can only participate in a basic login process, e.g., the client is a basic laptop, immediately after a web-based login process, an instructional web page is sent to the client directing the user to a specific web site, e.g., rs1.remediation.hp.com/remediate_instructions.htm, describing the process for completing a remediation process. If the user fails to follow these instructions, e.g., the user immediately tries to access a different web page such as http://www.hp.com, packets originated by the client are still confined to the remediation VLAN by tunneling as previously described, and the user has no real network access except for remediation purposes. The unauthorized request may arrive at the remediation server, e.g., by the broadcast method previously described, which is programmed to respond by sending the same initial web page giving instructions as to how to get remediated.

Additional security measures may be implemented on the switch serving the remediation VLAN, e.g., switch S3 218-3, to prevent loopholes in security, as necessary. For example, if an un-remediated client, e.g., network client C1 214-1, attempts to send a packet to another network client, e.g., network client CM 214-M, switch S3 is programmed to prevent immediate re-tunneling of packets through the network from un-remediated clients, even to other un-remediated clients. According to one embodiment of the present invention, virtual source port filters are utilized to prevent any traffic emerging from a remediation tunnel, e.g., packet 274, from being forwarded to any ports to which a remediation functionality, e.g., remediation server R1 250, is not connected, e.g., other than port 222-1 in this example.

Figure 5A:
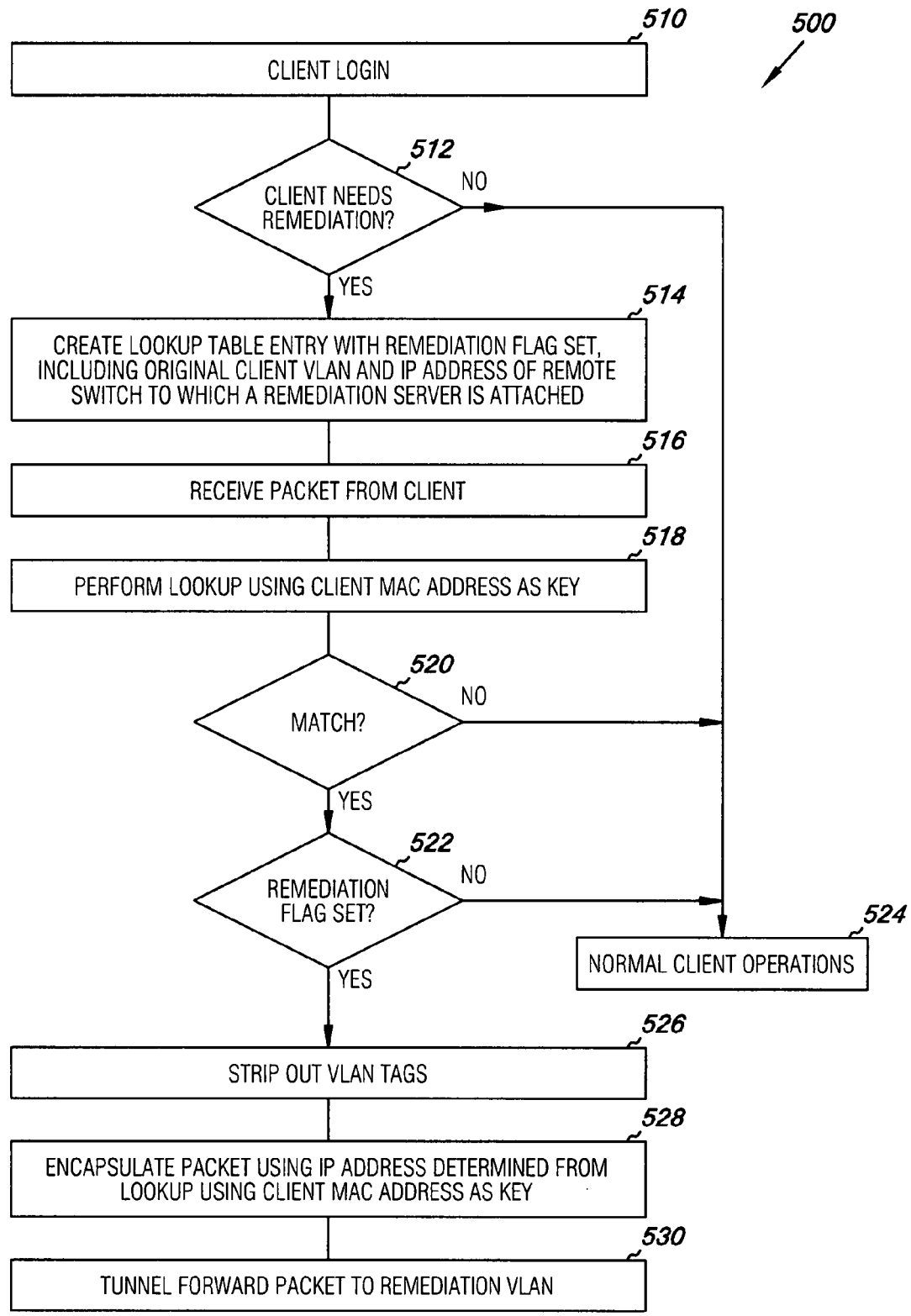
FIG. 5A provides a flow chart illustrating a first aspect of one method for tunneled network client remediation according to an embodiment of the present invention.

FIG. 5A illustrates a method 500 for implementing one aspect of remote client remediation. A client logs in to a network, e.g., network 100 in FIG. 1, at 510. According to embodiments, logic on the local network device to which the client connects, e.g., switch S1 218-1, or on the client itself, determines, at 512, whether the client needs remediation. If no client remediation is needed, the client progresses to normal client operations on the network, as shown at 524, according to its permitted access and privileges.

If client remediation is needed, as shown at 514, a remediation lookup table entry is created by the local network device to which the client is connected, e.g., switch S1 218-1 in FIG. 2, associated with the MAC address of the client, the entry having a remediation flag set and including the original client VLAN information and the IP address of a remote switch to which a remediation functionality, e.g., remediation server 250, is attached, the client being assigned to this remediation functionality, e.g., remediation server 250. A packet is received to the local network device, e.g., switch S1, from the client, at 516. A lookup is performed using the MAC address of the client as a key. If no match is found for the client MAC address, at 520, or the remediation flag for the entry corresponding to the client is not, or is no longer, set at 522, then the client is permitted normal client operations at 524.

If a match is found for the client MAC address, at 520, and the remediation flag for the entry corresponding to the client is set at 522, indicating remediation is needed, the network device strips out VLAN tags from the packet at 526, the packet is encapsulated using the IP address determined from the lookup using the MAC address of the client as key at 528, and the packet is tunnel forwarded to a remote network device associated with a remediation VLAN, at 530, for further remediation processing.

Figure 5B:
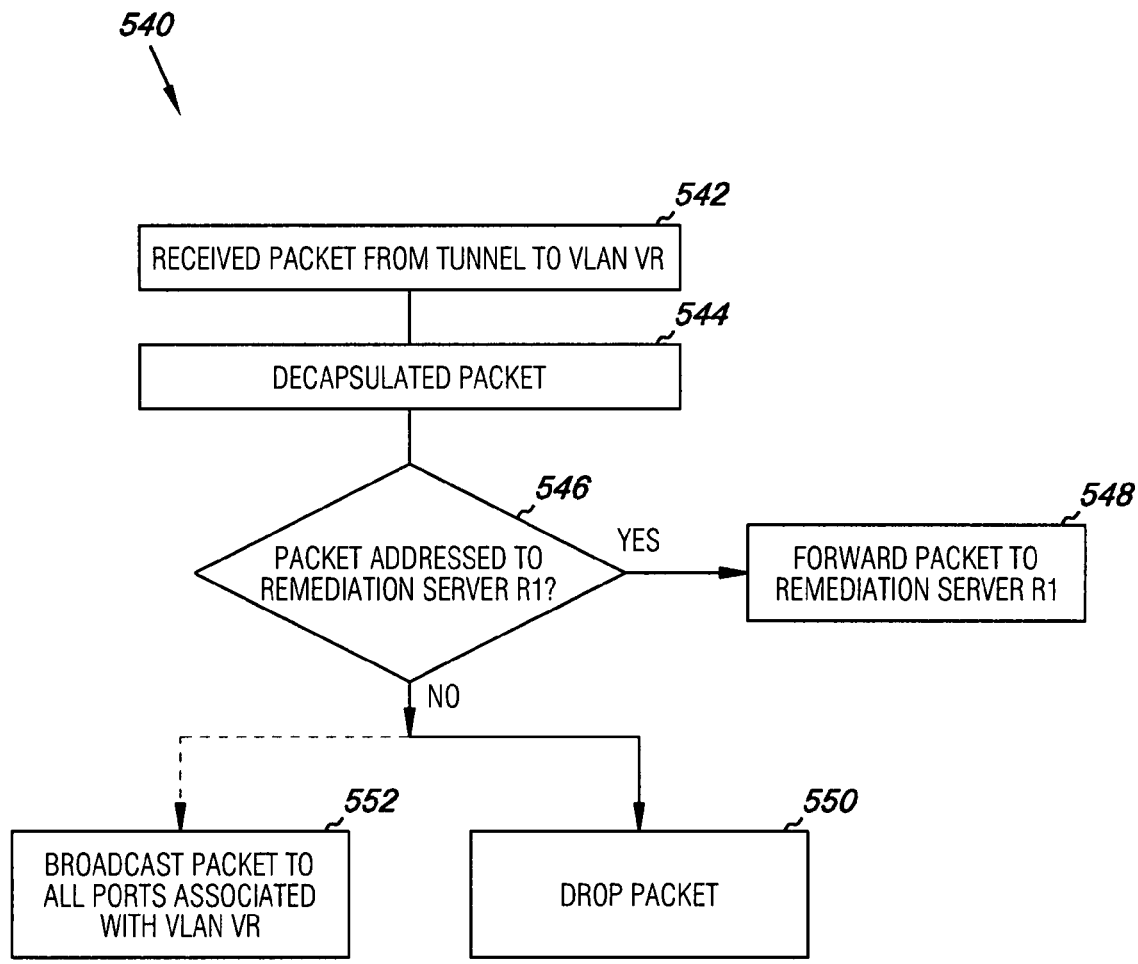
FIG. 5B provides a flow chart illustrating a second aspect of one method for tunneled network client remediation according to an embodiment of the present invention.

FIG. 5B illustrates a method 540 for implementing another aspect of remote client remediation. As shown at 542, the remote network device, e.g., switch S3 218-3 in FIG. 2, receives the packet from a remediation tunnel for the remediation VLAN, e.g., VLAN VR 296. The received packet is decapsulated at 544. A determination is made at 546 whether the packet is addressed to a specific remediation functionality, e.g., remediation server R1 250. If specifically addressed, the packet is forwarded to the remediation functionality, e.g., remediation server R1 250, at 548. If the packet is not addressed to a specific remediation functionality, e.g., remediation server R1 250, the packet is dropped at 550; or in the alternative, the packet is broadcast to all ports on the remote network device associated with the remediation VLAN, e.g., VLAN VR 296, as shown at 552.

Figure 5C:
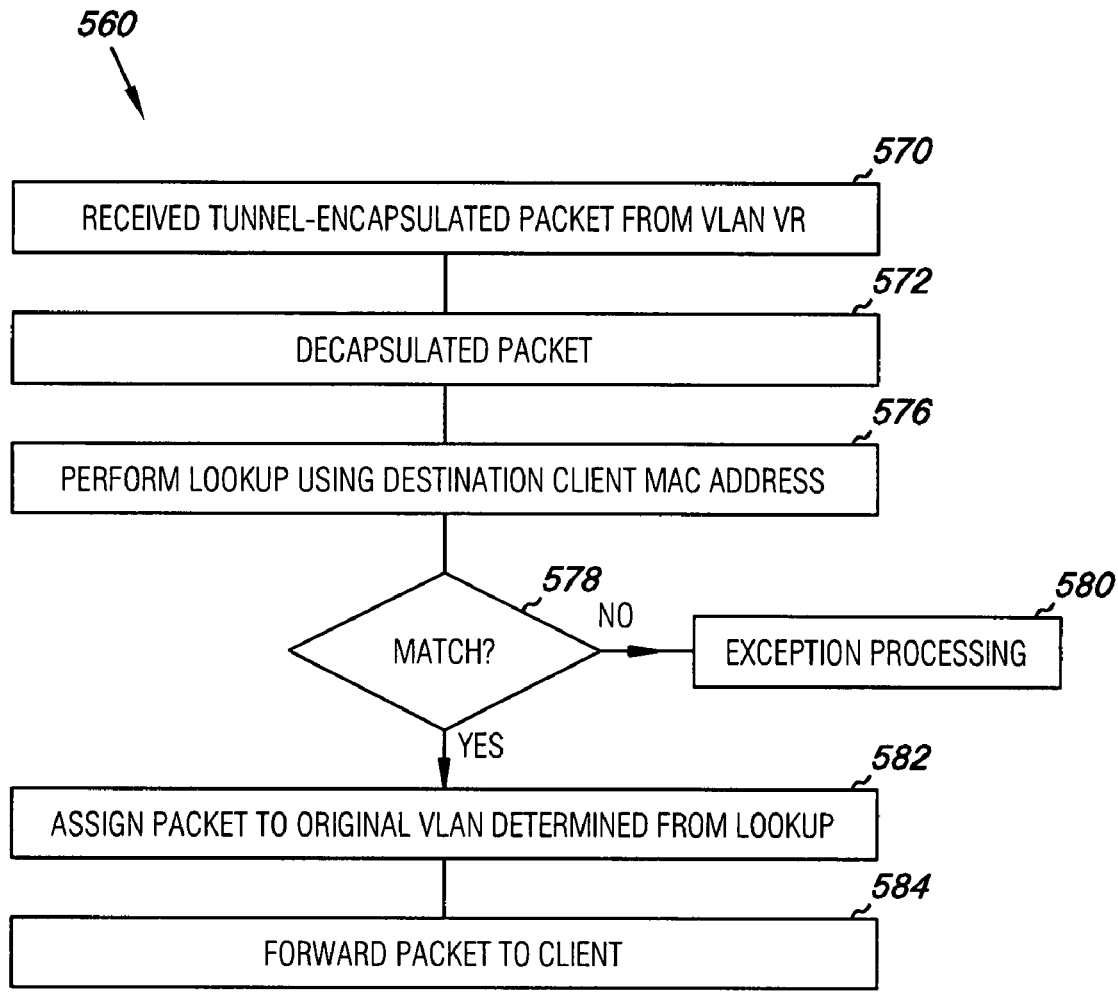
FIG. 5C provides a flow chart illustrating a third aspect of one method for tunneled network client remediation according to an embodiment of the present invention.

FIG. 5C illustrates a method 560 for implementing a third aspect of remote client remediation. A tunnel-encapsulated packet from the remediation VLAN, e.g., VLAN VR 296, is received at the local network device, e.g., switch S1 218-1, as shown at 570. The packet is decapsulated at 572, and a lookup is performed in a remediation lookup table, e.g., remediation lookup table 290-1, as shown at 576, using the destination MAC address corresponding to the client. If no match is found, at 578, the local network device executes exception processing to disposition the packet, as illustrated at 580. If a match is found at 578, the packet is assigned to the original VLAN of the client determined from the lookup, as shown at 582, and the packet is forwarded to the client, as illustrated at 584. In this manner, the client does not receive indication that the remediation resources are remote from its own, i.e., original, VLAN.

Figure 6:
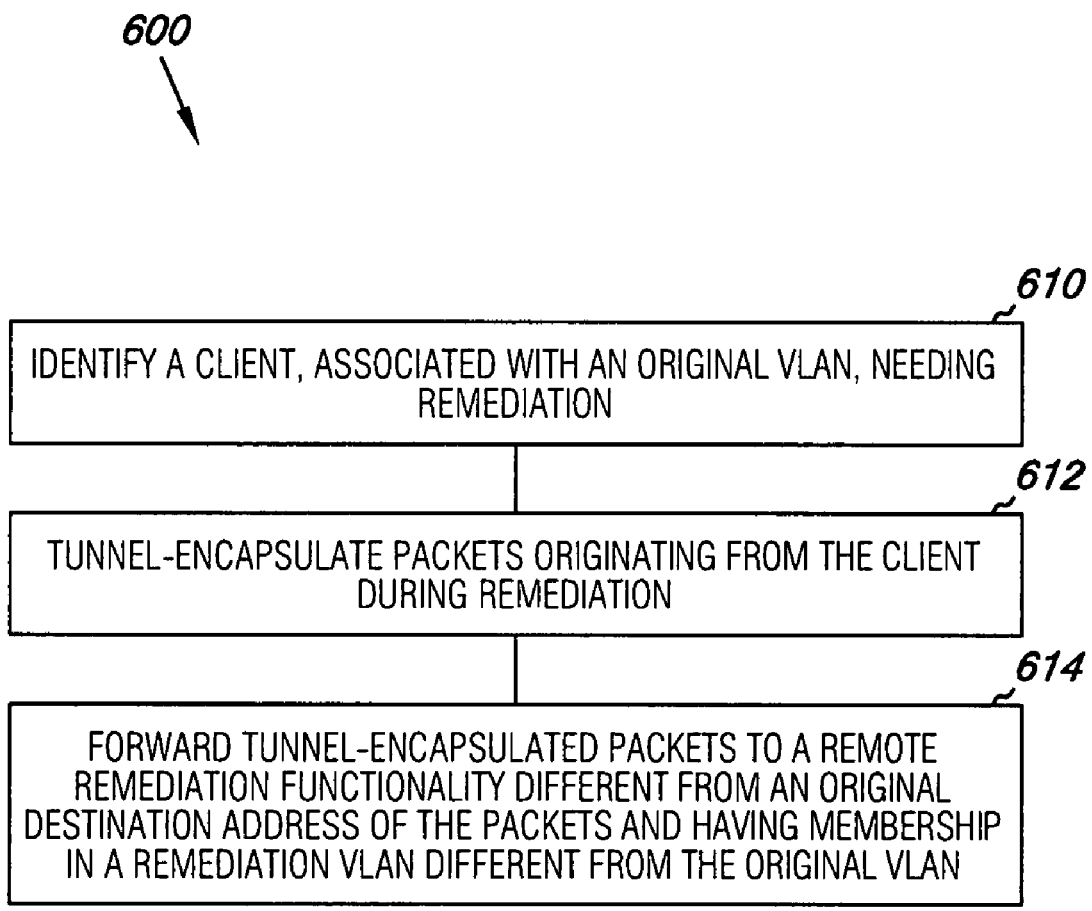
FIG. 6 illustrates a method for tunneled network client remediation according to an embodiment of the present invention.

FIG. 6 illustrates a method 600 for remote client remediation. The method includes identifying a client, associated with an original VLAN, needing remediation, as shown at block 610. Block 612 illustrates tunnel-encapsulating packets, e.g., all, originating from the client during remediation. The method further includes forwarding tunnel-encapsulated packets to a remote remediation functionality different from an original destination address of the packets, and having membership in a remediation VLAN different from the original VLAN, as shown at block 614. Logic, which is operable to perform the method described in connection with FIG. 6, can be present in whole or in part in embodiments of other figures. Embodiments, however, are not limited to the example given herein. Embodiments of the invention may include networks, network devices, systems, methods, and other embodiments, including executable instructions embodied on a computer readable medium and/or logic, or in a combination of both.

It is to be understood that the above description has been made in an illustrative fashion, and not a restrictive one. Although specific embodiments have been illustrated and described herein, those of ordinary skill in the art will appreciate that other component arrangements and device logic can be substituted for the specific embodiments shown. The claims are intended to cover such adaptations or variations of embodiments of the present invention, except to the extent limited by the prior art.

In the foregoing Detailed Description, various features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A method for remote client remediation, comprising:
   identifying, by a local network device, a client connected to the local network device and associated with an original VLAN and needing remediation;
   creating at the local network device an entry in a lookup table, said entry including a MAC address of the client, a flag indicating a remediation status of the client, information of the original VLAN, and a tunnel-encapsulation IP address of a remote switch connected to a remote remediation functionality;
   receiving at the local network device packets from the client during remediation;
   performing a lookup in the lookup table using information in the packets;
   if the information in the packets matches with the entry in the lookup table, determining whether the flag in the entry indicates the client needs remediation;
   if the flag in the entry indicates the client needs remediation, tunnel-encapsulating the packets; and
   forwarding the tunnel-encapsulated packets to the remote remediation functionality different from an original destination address of the packets and having membership in a remediation VLAN different from the original VLAN.

2. The method recited in claim 1, wherein the method includes isolating the client during remediation to communication with a subset of its post-remediation network access.

3. The method recited in claim 2, wherein the subset is limited to the remediation VLAN.

4. The method recited in claim 1, wherein the method includes removing original VLAN information from packets before forwarding to the remediation VLAN.

5. The method recited in claim 1, wherein all packets originating from the client during remediation are tunnel-encapsulated.

6. The method recited in claim 5, wherein the method includes restoring original VLAN information to packets before forwarding to the client.

7. The method recited in claim 6, wherein the method includes determining original VLAN information for each packet from the lookup table corresponding to a destination MAC address of the client as a key.

8. The method recited in claim 1, wherein the client needing remediation is identified using the lookup table keyed to the MAC address of the client.

9. The method recited in claim 1, wherein the method includes dropping a packet not addressed to the remediation functionality.

10. The method recited in claim 1, wherein the method includes learning from a packet received from a remediation tunnel that the client is located during remediation at the other end of the remediation tunnel.

11. A network, comprising:
    a first network device;
    a client associated with an original VLAN and connected to the first network device;
    a second network device; and
    a virtual remediation tunnel having a first destination associated with the first network device, and a second destination associated with the second network device;
    wherein the first network device has logic to:
    identify the client needing remediation;

create an entry in a lookup table, wherein said entry includes a MAC address of the client, a flag indicating a remediation status of the client, information of the original VLAN, and a tunnel-encapsulation IP address of the second network device;

receive packets from the client during remediation;

perform a lookup in the lookup table using information in the packets;

if the information in the packets matches with the entry in the lookup table, determine whether the flag in the entry indicates the client needs remediation;

if the flag in the entry indicates the client needs remediation, force the packets through the virtual remediation tunnel to a remediation VLAN associated with the second network device.

12. The network of claim 11, wherein the method includes a remote remediation functionality associated with the remediation VLAN.

13. The network of claim 12, wherein the second network device has logic to drop packets forced to the remediation VLAN not addressed to the remote remediation functionality.

14. The network of claim 11, wherein all packets originating from the client during remediation are forced to the remediation VLAN.

15. A network device, comprising:

a network chip including a number of network ports for receiving and transmitting packets therefrom, and logic to:

identify a client, associated with a first VLAN, needing remediation;

create an entry in a lookup table, said entry including a MAC address of the client, a flag indicating a remediation status of the client, information of the first VLAN, and a tunnel-encapsulation IP address of a remote switch connected to a remote remediation VLAN;

receive packets from the client during remediation;

perform a lookup in the lookup table using information in the packets;

if the information in the packets matches with the entry in the lookup table, determine whether the flag in the entry indicates the client needs remediation;

if the flag in the entry indicates the client needs remediation, tunnel-encapsulate the packets;

force the tunnel-encapsulated packets into a bridging tunnel having a destination end associated with the remote remediation VLAN during remediation; and wherein the first VLAN is different from the remote remediation VLAN.

16. The network device of claim 15, wherein performing the lookup in the lookup table using the information in the packets includes using a MAC address of the client as a lookup key.

17. The network device of claim 15, wherein the remote remediation VLAN includes a remote remediation functionality having a destination address different from an original destination address of the packets.

18. The network device of claim 15, wherein the network chip includes logic to remove first VLAN information from the packets before forcing the tunnel-encapsulated packets to the remediation VLAN.

19. The network device of claim 15, wherein the network chip includes logic to:

determine a received packet is from a tunnel associated with the remediation VLAN;

decapsulate the received packet; and assign first VLAN information to the packet before forwarding to the client.

20. The network device of claim 15, wherein the bridging tunnel is a secure bridging tunnel.

* * * * *